(12) United States Patent
Mizoguchi

(10) Patent No.: US 10,173,672 B2
(45) Date of Patent: Jan. 8, 2019

(54) VEHICLE CONTROL APPARATUS

(71) Applicant: Toyota Jidosha Kabushiki Kaisha, Toyota-shi, Aichi-ken (JP)

(72) Inventor: Yoji Mizoguchi, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 194 days.

(21) Appl. No.: 15/361,812

(22) Filed: Nov. 28, 2016

(65) Prior Publication Data

US 2017/0174211 A1  Jun. 22, 2017

(30) Foreign Application Priority Data

Dec. 22, 2015 (JP) ................. 2015-250669

(51) Int. Cl.
| | |
|---|---|
| *B60W 10/06* | (2006.01) |
| *B60W 30/09* | (2012.01) |
| *B60W 30/18* | (2012.01) |
| *B60W 50/08* | (2012.01) |
| *B60W 10/184* | (2012.01) |
| *B60W 10/188* | (2012.01) |

(52) U.S. Cl.
CPC ............ *B60W 30/09* (2013.01); *B60W 10/06* (2013.01); *B60W 10/184* (2013.01); *B60W 10/188* (2013.01); *B60W 30/181* (2013.01); *B60W 50/087* (2013.01); *B60W 2520/10* (2013.01); *B60W 2540/10* (2013.01); *B60W 2550/10* (2013.01); *B60W 2550/302* (2013.01); *B60W 2550/308* (2013.01); *B60W 2710/0666* (2013.01); *B60W 2710/105* (2013.01)

(58) Field of Classification Search
CPC .. B60W 30/09; B60W 10/184; B60W 50/087; B60W 30/181; B60W 10/06; B60W 10/188; B60W 2710/105; B60W 2550/302; B60W 2550/308; B60W 2520/10; B60W 2540/10; B60W 2710/0666; B60W 2550/10
See application file for complete search history.

(56) References Cited

U.S. PATENT DOCUMENTS

| | | | | |
|---|---|---|---|---|
| 2010/0030415 | A1* | 2/2010 | Tang | B60L 15/2063 701/22 |
| 2014/0012475 | A1* | 1/2014 | Pallett | B60T 7/06 701/70 |
| 2015/0353093 | A1* | 12/2015 | Pallett | B60W 30/18136 701/48 |

FOREIGN PATENT DOCUMENTS

| | | |
|---|---|---|
| JP | H09287488 A | 11/1997 |
| JP | 2013-129228 A | 7/2013 |
| JP | 2015190389 A * | 11/2015 |

* cited by examiner

*Primary Examiner* — Thomas Ingram
(74) *Attorney, Agent, or Firm* — Dinsmore & Shohl LLP

(57) ABSTRACT

The disclosure relates to a vehicle control apparatus. The apparatus executes a torque limit control for limiting an output torque of a vehicle to a torque equal to or smaller than a first torque when a torque limit condition is satisfied and a forced braking control for forcibly braking the vehicle when a forced braking condition is satisfied. The apparatus determines whether or not it is estimated that a stop condition that if the output torque is a predetermined torque larger, the forced braking condition is satisfied, is satisfied. The apparatus executes the torque limit control such that the output torque is limited to a torque equal to or smaller than a second torque equal to or larger than the predetermined torque when the torque limit condition and the stop condition are satisfied.

6 Claims, 8 Drawing Sheets

VEHICLE CONTROL APPARATUS

CROSS-REFERENCE TO RELATED APPLICATIONS

This application claim priority to Japanese Patent Application No. 2015-250669 filed on Dec. 22, 2015, the entire contents of which are hereby incorporated by reference.

BACKGROUND

Field

The present disclosure relates to a vehicle control apparatus for executing a control for preventing a vehicle from colliding against an object existing in a forward direction with respect to a vehicle or preventing the vehicle from strongly colliding against the object.

Description of the related art

A collision reduction system is known (for example, see JP H09-287488 A and JP 2013-129288 A). This collision reduction system prevents an own vehicle from colliding strongly against an object such as a wall in a parking area and a preceding vehicle traveling in front of the own vehicle by limiting an engine output torque output from an internal combustion engine of the own vehicle to a torque equal to or smaller than a constant torque when a driver of the own vehicle operates an acceleration pedal in mistake for a brake pedal in the case that a traveling speed of the own vehicle is zero or extreme small (for example, equal to or smaller than 5 km/h).

A collision avoidance system is also known (for example, see JP 2013-129288 A). This collision avoidance system prevents the own vehicle from colliding against the object existing in a forward direction of the own vehicle by forcibly braking the own vehicle by a braking device to stop the own vehicle before the own vehicle collides against the object when the driver of the own vehicle drives the own vehicle at a traveling speed equal to or larger than a predetermined traveling speed without realizing the object.

The collision avoidance system is configured to detect a distance between the object and the own vehicle, a relative speed between the object and the own vehicle by using a sensor such as a millimeter-wave sensor and determine whether or not a forced braking of the own vehicle by the braking device should be performed on the basis of the detected distance and the detected relative speed. Hereinafter, the detected distance will be referred to as "the object distance".

In this regard, when the traveling speed of the own vehicle is an extreme small traveling speed, detection accuracies of the object distance, the relative speed and the like may not be accuracies necessary for forcibly braking the vehicle, depending on a type of the sensor or a detection algorithm for detecting the object on the basis of an output of the sensor.

As a result, if a performance of the forced braking is permitted with the traveling speed of the own vehicle being the extreme small traveling speed, the own vehicle may be forcibly braked although the driver of the own vehicle intends to stop the own vehicle at a position close to the object with an operation of the acceleration pedal as an acceleration operator. Thereby, the driver may feel discomfort Accordingly, in the collision avoidance system that the detection accuracies of the object distance, the relative speed and the like do not satisfy the accuracies necessary for forcibly braking the own vehicle, a condition that the traveling speed of the own vehicle is equal to or larger than a predetermined traveling speed is set as a condition for performing the forced braking. Hereinafter, for convenient, in some cases, the predetermined traveling speed will be referred to as "the forced braking permission vehicle speed".

On the other hand, the collision reduction system determines whether or not a torque output from a torque output device as a vehicle driving source such as the internal combustion engine or an electric motor should be limited on the basis of the detected object distance. Hereinafter, the torque output from the torque output device will be referred to as "the output torque". Further, the collision reduction system prevents the own vehicle from colliding strongly against the object when the object distance is small, in particular, when the driver of the own vehicle drives the own vehicle into a garage and then, stops the own vehicle or when the driver of the own vehicle stops the own vehicle in a parking area. Thus, in the collision reduction system, a condition that the traveling speed of the own vehicle is zero or the extreme small traveling speed is set as a condition for limiting the output torque to a torque equal to or smaller than a constant torque. Therefore, when the collision reduction system is activated to limit the output torque, the traveling speed of the own vehicle is smaller than the forced braking permission vehicle speed and thus, the forced braking by the collision avoidance system is not performed.

In this regard, the inventor of this application has realized that when the object distance is relatively large, if the output torque is not limited, the traveling speed of the own vehicle reaches the forced braking permission vehicle speed by the relatively large output torque and at this time, if the forced braking is performed, the own vehicle is prevented from colliding against the object. In other words, according to a conventional technique, although the own vehicle can be stopped by the forced braking before the own vehicle reaches the object, the output torque is limited by the collision reduction system and as a result, the vehicle may reaches the object.

The present disclosure has been made for solving the aforementioned problem. One object of the present disclosure is to provide a vehicle control apparatus which can reduce a possibility that the vehicle collides against the object existing in the traveling direction of the own vehicle when the driver of the own vehicle operates the acceleration pedal mistakenly when the traveling speed of the own vehicle is zero or the extreme small traveling speed.

SUMMARY

The vehicle control apparatus according to the present disclosure is applied to a vehicle (100) comprising a torque output device (10), an acceleration operator (20) and a braking device (50). The torque output device (10) generates an output torque for accelerating the vehicle (100). The acceleration operator (20) is operated by a driver of the vehicle (100). The braking device (50) brakes the vehicle (100).

The vehicle control apparatus according to the present disclosure comprises a vehicle speed sensor (61), an object distance/relative speed detector (65, 66) and an electronic control unit (70). The vehicle speed sensor (61) is configured to detect a traveling speed of the vehicle (100) as a vehicle speed (Vs). The object distance/relative speed detector (65, 66) is configured to detect a distance between an object (101f, 101r) existing in a traveling direction of the vehicle (100) and the vehicle (100) as an object distance (Df, Dr) and detect a difference in moving speed between the object (101f, 101r) and the vehicle (100) as a relative speed (dVf, dVr). The electronic control unit (70) is configured to control the torque output device (10) such that the output torque increases as an operation amount (AP) of the acceleration operator (20) increases (see a routine of FIG. 8) and control the braking device (50) such that the vehicle (100) is braked when the vehicle (100) is needed to be braked (see a step 650 of FIG. 6).

The electronic control unit (70) is configured to calculate a time required for the vehicle (100) to reach the object (101f, 101r) as an object arrival time (TTCf, TTCr) on the basis of the object distance (Df, Dr) and the relative speed (dVf, dVr) (see a step 640 of FIG. 6). Further, the electronic control unit (70) is configured to execute a torque limit control for limiting the output torque to a torque equal to or smaller than a predetermined first torque (corresponding to a torque TQ1) (see steps 730 and 740 of FIG. 7) when a torque limit condition that the vehicle speed (Vs) is smaller than a first threshold vehicle speed (Vth1) and the electronic control unit (70) estimates that a driver of the vehicle (100) operates the acceleration operator (20) mistakenly to an operation amount (AP) larger than a threshold operation amount (APth) is satisfied (see a step 710 of FIG. 7). The first threshold vehicle speed (Vth1) may be set to a vehicle speed capable of stopping the vehicle (100) before the vehicle (100) reaches the object (101f, 101r) if the electronic control unit (70) starts to cause the braking device (50) to brake the vehicle (100) with a predetermined braking force when the object distance (Df, Dr) corresponds to a threshold distance (Dth). The electronic control unit (70) may be configured to estimate that the driver operates the acceleration operator (20) mistakenly to the operation amount (AP) larger than the threshold operation amount (APth) when the operation amount (AP) of the acceleration operator (20) is larger than the threshold operation (APth) and the object distance (Df, Dr) is equal to or smaller than the threshold distance (Dth) (see the step 710). Furthermore, the electronic control unit (70) is configured to execute a forced braking control for forcibly braking the vehicle (100) by the braking device (50) (see the step 650 of FIG. 6) when a forced braking condition that the vehicle speed (Vs) is equal to or larger than a second threshold vehicle speed (Vth2) equal to or larger than the first threshold vehicle speed (Vth1) and the object arrival time (TTCf, TTCr) is equal to or smaller than a threshold time (TTCth) is satisfied (see a determination "Yes" at the step 640). The threshold time (TTCth) may be set to a time capable of stopping the vehicle (100) before the vehicle (100) reaches the object (101f, 101r) if the electronic control unit (70) starts to cause the braking device (50) to brake the vehicle (100) with a predetermined braking force when the object arrival time (TTCf, TTCr) corresponds to the threshold time (TTCth).

According to the torque limit control, when the torque limit condition is satisfied, the output torque is limited to the torque equal to or smaller than the predetermined first torque and thus, the vehicle speed is prevented from increasing to the large extent. Thus, although the vehicle may contact the object to a small extent, the vehicle is prevented from colliding strongly against the object.

In this regard, when the object distance is relatively large even with the torque limit condition being satisfied, if the output torque is not limited to the predetermined first torque, the relatively large output torque is output from the torque output device and as a result, the vehicle speed may reach the second threshold vehicle speed before the object arrival time becomes equal to or smaller than the threshold time. In this case, the vehicle can be stopped by the forced braking control before the vehicle reaches the object.

In this regard, the electronic control unit (70) is configured to determine whether or not a stop condition that if the output torque is a predetermined torque (TQp) larger than the predetermined first torque (corresponding to the torque TQ1), the vehicle speed (Vs) reaches the second threshold vehicle speed (Vth2) to satisfy the forced braking condition before the object arrival time (TTCf, TTCr) becomes equal to or smaller than the threshold time (TTCth) is satisfied (see a step 720 of FIG. 7). Further, the electronic control unit (70) is configured to execute the torque limit control such that the output torque is limited to a torque equal to or smaller than a predetermined second torque (corresponding to the torque TQ2) equal to or larger than the predetermined torque (TQp) (see the step 730) when the torque limit condition is satisfied (see the determination "Yes" at the step 710 and the stop condition is satisfied (see the determination "Yes" at the step 720).

In other words, in the vehicle control apparatus according to the present disclosure, when the torque limit condition is satisfied, that is, when the vehicle speed is zero or an extreme small vehicle speed and the object exists in the traveling direction of the vehicle and the stop condition is satisfied, the output torque is limited to the torque equal to or smaller than the predetermined second torque. The predetermined second torque is larger than the predetermined first torque and equal to or larger than the predetermined torque which is considered as the stop condition.

Therefore, if the output torque determined depending on the operation amount of the acceleration operator is equal to or larger than the predetermined torque, the torque equal to or larger than the predetermined torque is output from the torque output device. In other words, when the driver operates the acceleration operator to the large extent in mistake for the brake pedal, the torque equal to or larger than the predetermined torque is output from the torque output device.

As a result, the vehicle speed reaches the second threshold vehicle speed before the vehicle reaches the object and then, the forced braking condition is satisfied. Thus, the vehicle is forcibly braked by the braking device and is stopped before the vehicle reaches the object. Thereby, when the driver operates the acceleration operator mistakenly with the vehicle speed being zero or the extreme small vehicle speed and the object existing in the traveling direction of the vehicle, a possibility that the vehicle collides against the object can be reduced.

In the above description, for facilitating understanding of the present disclosure, elements of the present disclosure corresponding to elements of an embodiment described later are denoted by reference symbols used in the description of the embodiment accompanied with parentheses. However, the elements of the present disclosure are not limited to the elements of the embodiment defined by the reference symbols. The other objects, features and accompanied advantages of the present disclosure can be easily understood from the description of the embodiment of the present disclosure along with the drawings.

DETAILED DESCRIPTION

Below, a vehicle control apparatus according to an embodiment of the present disclosure will be described with reference to the drawings. Hereinafter, the vehicle control apparatus according to the embodiment will be referred to as "the embodiment control apparatus".

Figure 1:
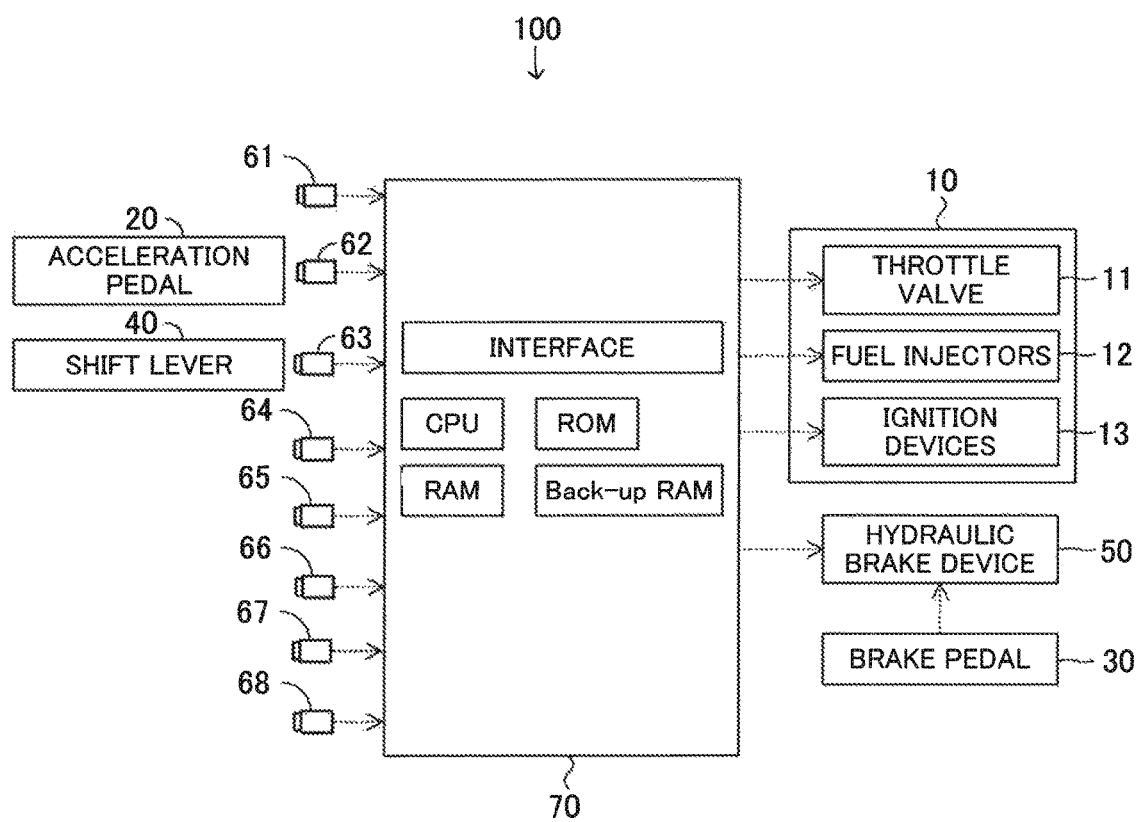
FIG. 1 is a view for showing a general configuration of a vehicle control apparatus according to an embodiment of the present disclosure and a vehicle, to which the vehicle control apparatus is applied.

As shown in FIG. 1, a vehicle 100, to which the embodiment control apparatus is applied, includes an internal combustion engine 10 as a torque output apparatus (i.e., a vehicle driving source which generates a driving torque for driving the vehicle 100), an acceleration pedal 20 as an acceleration operator, a brake pedal 30 as a brake operator, a shift lever 40 and a hydraulic brake device 50 as a braking device.

The engine 10 is a multi-cylinder (in this embodiment, four-cylinder) four-cycle spark-ignition type gasoline internal combustion engine. The engine 10 includes a throttle valve 11, fuel injectors 12 and ignition devices 13.

The throttle valve 11 is provided in an intake pipe (not shown) of the engine 10. The throttle valve 11 is electrically connected to an electronic control unit 70 described later. Hereinafter, the electronic control unit 70 will be referred to as "the ECU 70". The ECU 70 activates the throttle valve 11 such that an opening degree TA of the throttle valve 11 is controlled to a target value TAtgt. Hereinafter, the opening degree TA will be referred to as "the throttle valve opening degree TA". As the throttle vale opening degree TA changes, an amount Ga of an air suctioned into combustion chambers (now shown) of the engine 10 changes. Hereinafter, the amount Ga will be referred to as "the intake air amount Ga". The intake air amount Ga increases as the throttle valve opening degree TA increases.

Each of the fuel injectors 12 is provided such that each of the fuel injectors 12 injects a fuel to a corresponding intake port (not shown) of the engine 10. The fuel injectors 12 are electrically connected to the ECU 70. The ECU 70 activates the fuel injectors 12, respectively such that an amount Q of the fuel injected from each of the fuel injectors 12 corresponds to a target amount Qtgt.

Each of the ignition devices 13 is provided such that each the ignition devices 13 ignites a mixture gas of the fuel and the air formed in the corresponding combustion chamber of the engine 10. The ignition devices 13 are electrically connected to the ECU 70. The ECU 70 activates the ignition devices 13, respectively such that each of the ignition devices 13 ignites the mixture gas at a predetermined timing.

The acceleration pedal 20 is operated by a driver of the vehicle 100. As an amount AP of an operation of the acceleration pedal 20 by the driver increases, a torque TQE output from the engine 10, i.e., an engine output torque TQE of the engine 10 increases. Hereinafter, the amount AP will be referred to as "the acceleration pedal operation amount AP".

The brake pedal 30 is operated by the driver. The brake pedal 30 is connected to the hydraulic brake device 50. When the brake pedal 30 is operated by the driver, a braking force is applied from the hydraulic brake device 50 to the vehicle 100. As an amount of an operation of the brake pedal 30 increases, the braking force applied to the vehicle 100 increases.

The shift lever 40 is connected to an automatic transmission (not shown). An input shaft of the automatic transmission is connected to an output shaft of the engine 10 and an output shaft of the automatic transmission is connected to a drive shaft (not shown) connected to driving wheels of the vehicle 100. The shift lever 40 is operated by the driver. The shift lever 40 is set at any of a forward traveling range, a rearward traveling range, a neutral range and a parking range by the driver. When the shift lever 40 is set at the forward traveling range and the acceleration pedal operation amount AP becomes larger than zero, the vehicle 100 travels forward. When the shift lever 40 is set at the rearward traveling range and the acceleration pedal operation amount AP becomes larger than zero, the vehicle 100 travels rearward.

The ECU 70 is an electronic circuit including a well-known micro computer and includes a CPU, a ROM, a RAM, a back-up RAM and an interface. A vehicle speed sensor 61, an acceleration pedal operation amount sensor 62, a shift position sensor 63, an air flow meter 64, a front millimeter-wave radar 65, a rear millimeter-wave radar 66, a gear position sensor 67 and an engine speed sensor 68 are connected to the ECU 70.

The vehicle speed sensor 61 detects a traveling speed Vs of the vehicle 100 and outputs a signal representing the traveling speed Vs. Hereinafter, the traveling speed Vs will be referred to as "the vehicle speed Vs". The ECU 70 calculates the vehicle speed Vs on the basis of the signal received from the vehicle speed sensor 61.

The acceleration pedal operation amount sensor 62 detects the acceleration pedal operation amount AP and outputs a signal representing the acceleration pedal operation amount AP. The ECU 70 calculates the acceleration pedal operation amount AP on the basis of the signal received from the acceleration pedal operation amount sensor 62.

The shift lever position sensor 63 detects a range, at which the shift lever 40 is set, and outputs a signal representing the detected range. The ECU 70 recognizes the range, at which the shift lever 40 is set, on the basis of the signal received from the shift lever position sensor 63.

The air flow meter 64 is provided on the intake pipe (not shown). The air flow meter 64 detects the intake air amount Ga of the air flowing in the intake pipe toward the combustion chambers (not shown) and outputs a signal representing the intake air amount Ga. The ECU 70 calculates the intake air amount Ga on the basis of the signal received from the air flow meter 64. In addition, the ECU 70 calculates the target amount Qtgt of the fuel injected from each of the fuel injectors 12 on the basis of the intake air amount Ga such that an air-fuel ratio of the mixture gas formed in each of the combustion chambers corresponds to a predetermined air-fuel ratio (for example, a stoichiometric air-fuel ratio). Hereinafter, the target amount Qtgt will be referred to as "the target fuel injection amount Qtgt".

The front millimeter-wave radar 65 is mounted on a front end portion of the vehicle 100. The front millimeter-wave radar 65 sends a millimeter wave (i.e., an output wave) in a forward direction with respect to the vehicle 100. The millimeter wave is reflected by an object existing at a forward position with respect to the vehicle 100. The front millimeter-wave radar 65 receives the reflected millimeter wave.

Figure 3A:
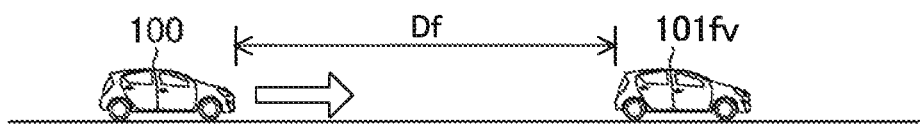
FIG. 3A is a view used for describing a collision avoidance control executed by a CPU of an electronic control unit (i.e., an ECU) shown in FIG. 1.
Figure 4A:
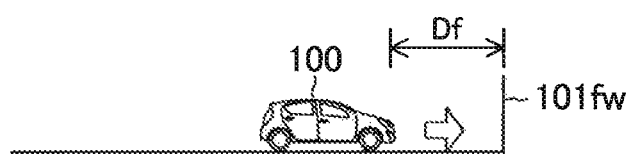
FIG. 4A is a view used for describing a collision reduction control executed by the CPU.
Figure 4B:
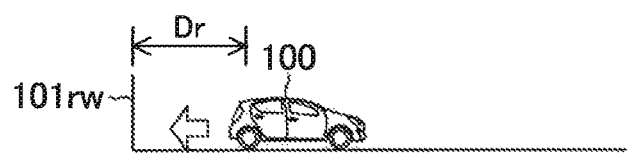
FIG. 4B is a view used for describing a collision reduction control executed by the CPU.

For example, the object existing at the forward position with respect to the vehicle 100 is a vehicle 101$fv$ traveling in front of the vehicle 100 as shown in FIG. 3A or a stationary object 101$fw$ such as a wall existing in front of the vehicle 100 as shown in FIG. 4A. Hereinafter, the vehicle 101$fv$ traveling in front of the vehicle 100 will be referred to as "the preceding vehicle 101$fv$" and the object existing at the forward position with respect to the vehicle 100 will be referred to as "the forward object 101$f$".

The ECU 70 detects the forward object 101$f$ on the basis of the reflected millimeter wave received by the front millimeter-wave radar 65.

In addition, the ECU 70 calculates a difference dVf between the vehicle speed Vs of the vehicle 100 and a moving speed Vf of the forward object 101$f$ (dVf=Vf−Vs), a distance Df between the vehicle 100 and the forward object 101$f$, a relative orientation ROf of the forward object 101$f$ with respect to a position of the vehicle 100 and the like in chronological order each time a predetermined time elapses on the basis of a phase difference between the millimeter wave sent from the front millimeter-wave radar 65 in the forward direction with respect to the vehicle 100 and the received reflected millimeter wave, an attenuation level of the received reflected millimeter wave, a detection time of the received reflected millimeter wave and the like. Hereinafter, the difference dVf will be referred to as "the forward relative speed dVf", the distance Df will be referred to as "the forward object distance Df" and the relative orientation ROf will be referred to as "the forward relative orientation ROf".

Further, the ECU 70 calculates a time TTCf required for the front end portion of the vehicle 100 to reach the forward object 101$f$ by dividing the forward object distance Df by the forward relative speed dVf (TTCf=Df/dVf). Hereinafter, the time TTCf will be referred to as "the forward object arrival time TTCf".

The ECU 70 stores the calculated forward relative speed dVf, the calculated forward object distance Df, the forward relative orientation ROf, the calculated forward object arrival time TTCf and the like in the RAM of the ECU 70.

The rear millimeter-wave radar 66 is mounted on a rear end portion of the vehicle 100. The rear millimeter-wave radar 66 sends a millimeter wave (i.e., an output wave) in a rearward direction with respect to the vehicle 100. The millimeter wave is reflected by an object existing at a rearward position with respect to the vehicle 100. The rear millimeter-wave radar 66 receives the reflected millimeter wave.

Figure 3B:
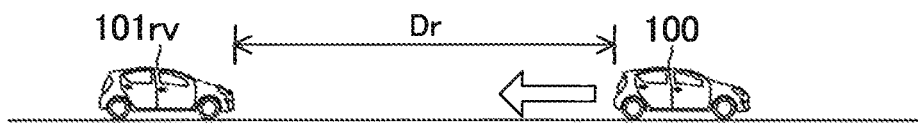
FIG. 3B is a view used for describing a collision avoidance control executed by a CPU of an electronic control unit (i.e., an ECU) shown in FIG. 1.

For example, the object existing at the rearward position with respect to the vehicle 100 is a vehicle 101$ry$ traveling behind the vehicle 100 (i.e., a following vehicle 101$rv$) as shown in FIG. 3B or a stationary object 101$rw$ such as a wall behind the vehicle 100. Hereinafter, the object existing at the rearward position with respect to the vehicle 100 will be referred to as "the rearward object 101$r$".

The ECU 70 detects the rearward object 101$r$ on the basis of the reflected millimeter wave received by the rear millimeter-wave radar 66.

In addition, the ECU 70 calculates a difference dVr between the vehicle speed Vs of the vehicle 100 and a moving speed Vr of the rearward object 101$r$ (dVr=Vr−Vs), a distance Dr between the vehicle 100 and the rearward object 101$r$, a relative orientation ROr of the rearward object 101$r$ with respect to the position of the vehicle 100 and the like in chronological order each time a predetermined time elapses on the basis of a phase difference between the millimeter wave sent from the rear millimeter-wave radar 66 in the rearward direction with respect to the vehicle 100 and the received reflected millimeter wave, an attenuation level of the received reflected millimeter wave, a detection time of the received reflected millimeter wave and the like. Hereinafter, the difference dVr will be referred to as "the rearward relative speed dVr", the distance Dr will be referred to as "the rearward object distance Dr" and the relative orientation ROr will be referred to as "the rearward relative orientation ROr".

Further, the ECU 70 calculates a time TTCr required for the rear end portion of the vehicle 100 to reach the rearward object 101$r$ by dividing the rearward object distance Dr by the rearward relative speed dVr (TTCr=Dr/dVr). Hereinafter, the time TTCr will be referred to as "the rearward object arrival time TTCr".

The ECU 70 stores the calculated rearward relative speed dVr, the calculated rearward object distance Dr, the rearward relative orientation ROr, the calculated rearward object arrival time TTCr and the like in the RAM of the ECU 70.

The gear position sensor 67 detects a gear position Shift (first to fourth gear positions and a reverse gear position) of the automatic transmission. The ECU 70 acquires the current gear position Shift of the automatic transmission on the basis of a signal received from the gear position sensor 67.

The engine speed sensor 68 generates a pulse signal depending on a rotation speed NE of the engine 10. The ECU 70 acquires the rotation speed NE of the engine 10 on the basis of the pulse signal received from the engine speed sensor 68. Hereinafter, the rotation speed NE of the engine 10 will be referred to as "the engine speed NE".

Figure 2:
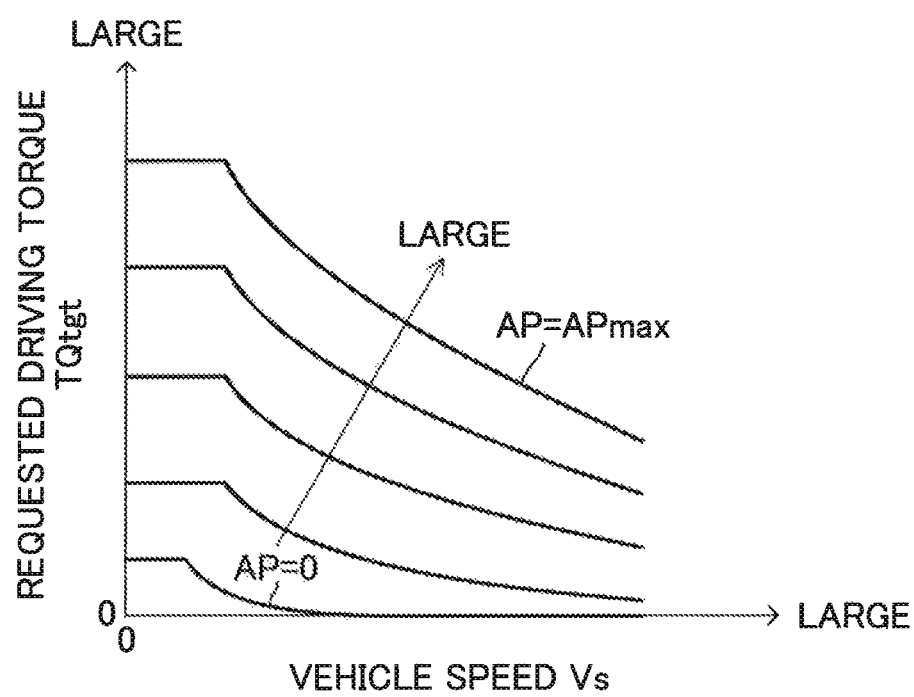
FIG. 2 is a view for showing a relationship of a requested driving torque with an amount of an operation of an acceleration pedal and a traveling speed of the vehicle.

The ECU 70 has stored a look-up table MapTQtgt(AP, Vs) shown in FIG. 2 in the ROM of the ECU 70. The ECU 70 applies the acceleration pedal operation amount AP and the vehicle speed Vs to the look-up table MapTQtgt(AP, Vs) to acquire the torque TQtgt requested to be output from the engine 10 to the vehicle 100. Hereinafter, the torque TQtgt requested to be output from the vehicle 100 will be referred to as "the requested driving torque TQtgt".

According to the look-up table MapTQtgt(AP, Vs), the requested driving torque TQtgt increases as the acceleration pedal operation amount AP increases. The requested driving torque TQtgt is constant when the vehicle speed Vs is between zero and a certain vehicle speed with the acceleration pedal operation amount AP being constant. The requested driving torque TQtgt decreases as the vehicle speed Vs increases when the vehicle speed Vs is larger than the certain vehicle speed with the acceleration pedal operation amount AP being constant.

The ECU 70 calculates a target value TQEtgt of the output torque TQE of the engine 10 necessary for applying a torque corresponding to the requested driving torque TQtgt ro the driving wheels of the vehicle 100 on the basis of the requested driving torque TQtgt and the gear position Shift. Hereinafter, the target value TQEtgt will be referred to as "the target engine output torque TQEtgt". Further, the ECU 70 calculates a target value TAtgt of the throttle valve opening degree TA for causing the engine 10 to output the engine output torque TQE corresponding to the target engine output torque TQEtgt on the basis of the target engine output torque TQEtgt and the engine speed NE. Hereinafter, the target value TAtgt will be referred to as "the target throttle valve opening degree TAtgt". Further, the ECU 70 activates the throttle valve 11 such that the calculated target throttle valve opening degree TAtgt is achieved.

As described above, as the acceleration pedal operation amount AP increases, the requested driving torque TQtgt increases. Therefore, as the acceleration pedal operation amount AP increases, the target engine output torque TQEtgt increases and thus, the target throttle valve opening degree TAtgt increases. As a result, the intake air amount Ga increases and thus, the target fuel injection amount Qtgt increases.

<Summary of Collision Avoidance Control>

Next, a collision avoidance control executed by the embodiment control apparatus will be described.

When the shift lever 40 is set at the forward traveling range, the embodiment control apparatus determines whether or not a first condition that the current vehicle speed Vs is equal to or larger than a second threshold vehicle speed Vth2 and the forward object arrival time TTCf is equal to or smaller than a threshold time TTCth is satisfied. Hereinafter, the first condition will be referred to as "the forced braking condition". On the other hand, when the shift lever 40 is set at the rearward traveling range, the embodiment control apparatus determines whether or not a second condition that the current vehicle speed Vs is equal to or larger than the second threshold vehicle speed Vth2 and the rearward object arrival time TTCr is equal to or smaller than the threshold time TTCth is satisfied. Hereinafter, the second condition will be also referred to as "the forced braking condition".

The threshold time TTCth is set to a time sufficient for stopping the vehicle 100 before the front or rear end portion of the vehicle 100 reaches the forward object 101f or the rearward object 101r by starting to apply a predetermined braking force to the vehicle 100 from the hydraulic brake device 50 to forcibly brake the vehicle 100 when the forward object arrival time TTCf or the rearward object arrival time TTCr reaches the threshold time TTCth. In general, the predetermined braking force is a maximum value of the braking force which can stop the vehicle 100 safely.

When the forced braking condition is satisfied, the embodiment control apparatus brakes the vehicle 100 forcibly by the hydraulic brake device 50. In other words, the embodiment control apparatus performs a forced braking of the vehicle 100. Thereby, the vehicle 100 is prevented from colliding against the forward or rearward object 101f or 101r.

<Summary of Collision Reduction Control>

Next, a collision reduction control executed by the embodiment control apparatus will be described.

When the shift lever 40 is set at the forward traveling range, the embodiment control apparatus determines whether or not a third condition that the current vehicle speed Vs is smaller than a first threshold vehicle speed Vth1 equal to or smaller than the second threshold vehicle speed Vth2, the acceleration pedal operation amount AP is larger than a threshold operation amount APth and the forward object distance Df is equal to or smaller than a threshold distance Dth is satisfied. Hereinafter, the third condition will be referred to as "the torque limit condition". In this embodiment, the threshold operation amount APth is zero.

On the other hand, when the shift lever 40 is set at the rearward traveling range, the embodiment control apparatus determines whether or not a fourth condition that the current vehicle speed Vs is smaller than the first threshold vehicle speed Vth1, the acceleration pedal operation amount AP is larger than the threshold operation amount APth and the rearward object distance Dr is equal to or smaller than the threshold distance Dth is satisfied. Hereinafter, the fourth condition will be also referred to as "the torque limit condition".

The threshold distance Dth is set to a distance sufficient for stopping the vehicle 100 before the front or rear end portion of the vehicle 100 reaches the forward object 101f or the rearward object 101r by starting to apply a predetermined braking force to the vehicle 100 from the hydraulic brake device 50 to forcibly brake the vehicle 100 when the vehicle speed Vs corresponds to the first threshold vehicle speed Vth1.

When the shift lever 40 is set at the forward traveling range and the torque limit condition is satisfied, the embodiment control apparatus predicts or estimate whether or not a first stop condition is satisfied. The first stop condition is a condition that the vehicle speed Vs reaches the second threshold vehicle speed Vth2 before the forward object arrival time TTCf becomes equal to or smaller than the threshold time TTCth and then, the forced braking condition is satisfied and thus, the forced braking control is executed assuming that the engine output torque TQE corresponds to a predetermined torque TQEp with the current gear position being maintained, that is, the driving torque of the vehicle 100 corresponds to a driving torque TQp corresponding to the predetermined torque TQEp with the current gear position being maintained.

On the other hand when the shift lever 40 is set at the rearward traveling range and the torque limit condition is satisfied, the embodiment control apparatus predicts or estimates whether or not a second stop condition is satisfied. The second stop condition is a condition that the vehicle speed Vs reaches the second threshold vehicle speed Vth2 before the rearward object arrival time TTCr becomes equal to or smaller than the threshold time TTCth and then, the forced braking condition is satisfied and thus, the forced braking control is executed assuming that the engine output torque TQE corresponds to the predetermined torque TQEp with the current gear position being maintained, that is, the driving torque of the vehicle 100 corresponds to the driving torque TQp corresponding to the predetermined torque TQEp with the current gear position being maintained.

Figure 5:
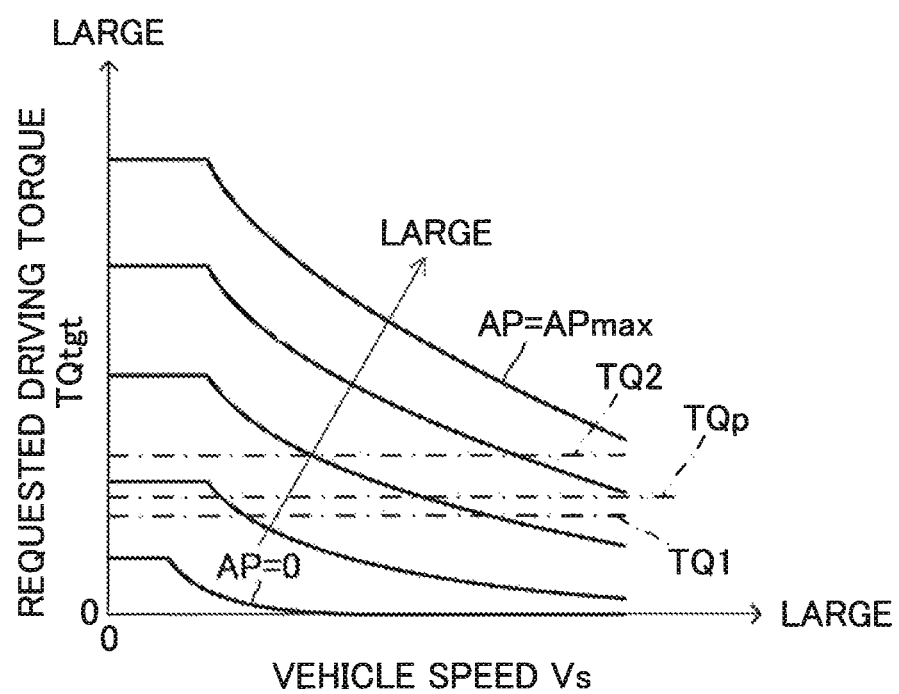
FIG. 5 is a view for showing a relationship of the requested driving torque with the amount of the operation of the acceleration pedal and the traveling speed of the vehicle.

When the embodiment control apparatus does not predict that the first or second stop condition is satisfied, the embodiment control apparatus limits the engine output torque TQE to a torque equal to or smaller than a first torque smaller than the predetermined torque TQEp such that the requested driving torque TQtgt is limited to a torque equal to or smaller than a first driving torque TQ1 smaller than the predetermined driving torque TQp (see FIG. 5). In other words, the embodiment control apparatus performs a first engine output torque limitation.

In this case, when the target engine output torque TQEtgt determined depending on the acceleration pedal operation amount AP is larger than the first torque, the engine 10 outputs a torque corresponding to the first torque. On the other hand, when the target engine output torque TQEtgt determined depending on the acceleration pedal operation amount AP is equal to or smaller than the first torque, the engine 10 outputs a torque corresponding to the target engine output torque TQEtgt. Thereby, an increase of the vehicle speed Vs is small in any case and thus, the vehicle 100 is prevented from strongly colliding against the forward or rearward object 101f or 101r.

When the embodiment control apparatus predicts that the first or second stop condition is satisfied, the embodiment control apparatus limits the engine output torque TQE to a torque equal to or smaller than a second torque equal to or larger than the predetermined torque TQEp such that the requested driving torque TQtgt is limited to a torque equal to or smaller than a second driving torque TQ2 equal to or larger than the predetermined driving torque TQp (see FIG. 5). In other words, the embodiment control apparatus performs a second engine output torque limitation.

In this case, when the target engine output torque TQEtgt determined depending on the acceleration pedal operation amount AP is equal to or larger than the predetermined torque TQEp, the engine 10 outputs a torque equal to or larger than the predetermined torque TQEp. In other words, the driving torque of the vehicle 100 is equal to or larger than the predetermined driving torque TQp larger than the first driving torque TQ1. Thereby, the vehicle speed Vs increases quickly and then, reaches the threshold vehicle speed Vth.

When the forced braking condition that the vehicle speed Vs is equal to or larger than the second threshold vehicle speed Vth2 and the forward or rearward object arrival time TTCf or TTCr is equal to or smaller than the threshold time TTCth is satisfied, the embodiment control apparatus forcibly brakes the vehicle 100 by the hydraulic brake device 50. In other words, the embodiment control apparatus performs a forced braking of the vehicle 100. Thereby, the vehicle 100 is prevented from colliding against the forward or rearward object 101f or 101r.

On the other hand, when the target engine output torque TQEtgt determined depending on the acceleration pedal operation amount AP is smaller than the predetermined torque TQEp, the engine 10 outputs the engine output torque TQE smaller than the predetermined engine output torque TQEp. In this case, the increase of the vehicle speed Vs is small and thus, the vehicle 100 is prevented from strongly colliding against the forward or rearward object 101f or 101r.

<Concrete Operation of Embodiment Control Apparatus>

Next, a concrete operation of the embodiment control apparatus will be described. The CPU of the ECU 70 of the embodiment control apparatus is configured or programmed to execute a routine shown by a flowchart in FIG. 6 each time a predetermined time elapses.

Therefore, at a predetermined timing, the CPU starts a process from a step 600 and then, proceeds with the process to a step 610 to determine whether or not a value of a forced braking flag Xpc is "0". The value of the forced braking flag Xpc is set to "1" when the forced braking of the vehicle 100 by the hydraulic brake device 50 is started by a process of a step 650 described later. On the other hand, the value of the forced braking flag Xpc is set to "0" when the forced braking is stopped by a process of a step 670 described later.

When the forced braking has not been started upon the execution of the process of the step 610, the value of the forced braking flag Xpc is "0" upon the execution of the process of the step 610. In this case, the CPU determines "Yes" at the step 610 and then, proceeds with the process to a step 620 to determine whether or not a value of a limit torque increase flag Xtq is "0".

The value of the limit torque increase flag Xtq is set to "1" when a limit driving torque TQlimit is set to the second driving torque TQ2 by a process of a step 730 of FIG. 7 described later. On the other hand, the value of the limit torque increase flag Xtq is set to "0" when the limit driving torque TQlimit is set to the first driving torque TQ1 by a process of a step 740 of FIG. 7 described later or when the limit driving torque TQlimit is set to an infinite by a process of a step 750 of FIG. 7 described later, that is, the setting of the limit driving torque TQlimit is released.

When the limit driving torque TQlimit is set to the first driving torque TQ1 or the setting of the limit driving torque TQlimit is released upon the execution of the process of the step 620, the value of the limit torque increase flag Xtq is "0" upon the execution of the process of the step 620. In this case, the CPU determines "Yes" at the step 620 and then, proceeds with the process to a step 630 to determine whether or not the acceleration pedal operation amount AP is smaller than a predetermined operation amount APlimit.

When the acceleration pedal operation amount AP is large, it can be estimated that the driver intends to cause the engine 10 to output the large engine output torque TQE. In this case, it is not preferred to perform the forced braking. The predetermined operation amount APlimit is set in consideration of such a driver's intention. Therefore, the predetermined operation amount APlimit is set to a relatively large value such as a value equal to or larger than 90 percent of a maximum value APmax of the acceleration pedal operation amount AP.

When the acceleration pedal operation amount AP is smaller than the predetermined operation amount APlimit, the CPU determines "Yes" at the step 630 and then, proceeds with the process to a step 640 to calculate the forward object arrival time TTCf as described above if the shift lever 40 is set at the forward traveling range. In addition, the CPU determines whether or not the forced braking condition that the vehicle speed Vs is equal to or larger than the second threshold vehicle speed Vth2 and the forward object arrival time TTCf is equal to or smaller than the threshold time TTCth is satisfied. On the other hand, the CPU calculates the rearward object arrival time TTCr as described above if the shift lever 40 is set at the rearward traveling range. In addition, the CPU determines whether or not the forces braking condition that the vehicle speed Vs is equal to or larger than the second threshold vehicle speed Vth2 and the rearward object arrival time TTCr is equal to or smaller than the threshold time TTCth is satisfied. When the forced braking condition is satisfied, the CPU determines "Yes" at the step 640 and then, proceeds with the process to the step 650.

When the CPU proceeds with the process to the step 650, the CPU sends a command for applying the predetermined braking force to the vehicle 100 to the hydraulic brake device 50 to perform the forced braking and sets the value of the forced braking flag Xpc to "1". Then, the CPU proceeds with the process to a step 695 to terminate an execution of this routine once.

In this case, the predetermined braking force is applied to the vehicle 100 by the hydraulic brake device 50. In other words, the forced braking is performed. Thereby, the vehicle 100 stops before the vehicle 100 reaches the forward or rearward object 101f or 101r. Thus, the vehicle 100 is prevented from colliding against the forward or rearward object 101f or 101r.

It should be noted that when the value of the forced braking flag Xpc is set to "1" at the step 650, the CPU determines "No" at a step 805 of FIG. 8 described later and then, proceeds with the process to a step 845 to set the target throttle valve opening degree TAtgt to a predetermined idling opening degree TAidle. Therefore, when the forced braking is performed, the throttle valve opening degree TA is controlled to the predetermined idling opening degree TAidle.

When the forced braking condition is not satisfied upon the execution of the process of the step 640, the CPU determines "No" at the step 640 and then, proceeds with the process directly to the step 695 to terminate the execution of this routine once.

In this case, the forced braking is not performed and a normal operation of the engine 10 is performed. In other words, the throttle valve opening degree TA is controlled such that the requested driving torque TQtgt determined depending on the acceleration pedal operation amount AP and the vehicle speed Vs is achieved, that is, the engine 10 outputs the engine output torque TQE corresponding to the target engine output torque TQEtgt for achieving the requested driving torque TQtgt. In addition, the target fuel injection amount Qtgt of the fuel determined for controlling the air-fuel ratio of the mixture gas to a predetermined air-fuel ratio is injected into each of the combustion chambers from the corresponding fuel injector 12 at a predetermined timing and the fuel in each of the combustion chambers is ignited by the corresponding ignition device 13 at a predetermined timing.

When the limit driving torque TQlimit has been set to the second driving torque TQ2 upon the execution of the process of the step 620, the value of the limit torque increase flag Xtq is "1" (see the step 730 of FIG. 7 described later). In this case, the CPU determines "No" at the step 620 and then, proceeds with the process directly to the step 640.

As described above, when the CPU proceeds with the process to the step 640, the CPU determines whether or not the forced braking condition is satisfied. When the forced braking condition is satisfied, the CPU determines "Yes" at the step 640 and then, proceeds with the process to the step 650 to send the command for applying the predetermined braking force to the vehicle 100 and set the value of the forced braking flag Xpc to "1". Thereby, the forced braking is performed.

It should be noted that when the acceleration pedal operation amount AP is equal to or larger than the predetermined operation amount APlimit upon the execution of the process of the step 630, the CPU determines "No" at the step 630 and then, proceeds with the process directly to the step 695 to terminate the execution of this routine once. In this case, the forced braking is not performed.

As described above, when the forced braking is started by the execution of the process of the step 650, the value of the forced braking flag Xpc is set to "1". Therefore, when the CPU proceeds with the process to the step 610 after the value of the forced braking flag Xpc is set to "1", the CPU determines "No" at the step 610 and then, proceeds with the process to a step 660 to determine whether or not a time TKK elapsing from when the vehicle speed Vs becomes zero by the forced braking is equal to or larger than a predetermined time TKKth. Hereinafter, the time TKK will be referred to as "the elapsed time TKK".

When the elapsed time TKK is smaller than the predetermined time TKKth, the CPU determines "No" at the step 660 and then, proceeds with the process to the step 695 to terminate the execution of this routine once. In this case, the forced braking continues to be performed.

On the other hand, when the elapsed time TKK is equal to or larger than the predetermined time TKKth, the CPU determines "Yes" at the step 660 and then, proceeds with the process to the step 670 to send a command for stopping the application of the predetermined braking force to the hydraulic brake device 50 to stop the forced braking and set the value of the forced braking flag Xpc to "0". Then, the CPU proceeds with the process to the step 695 to terminate the execution of this routine once. As a result, the forced braking is stopped and the normal operation of the engine 10 is restarted.

Figure 7:
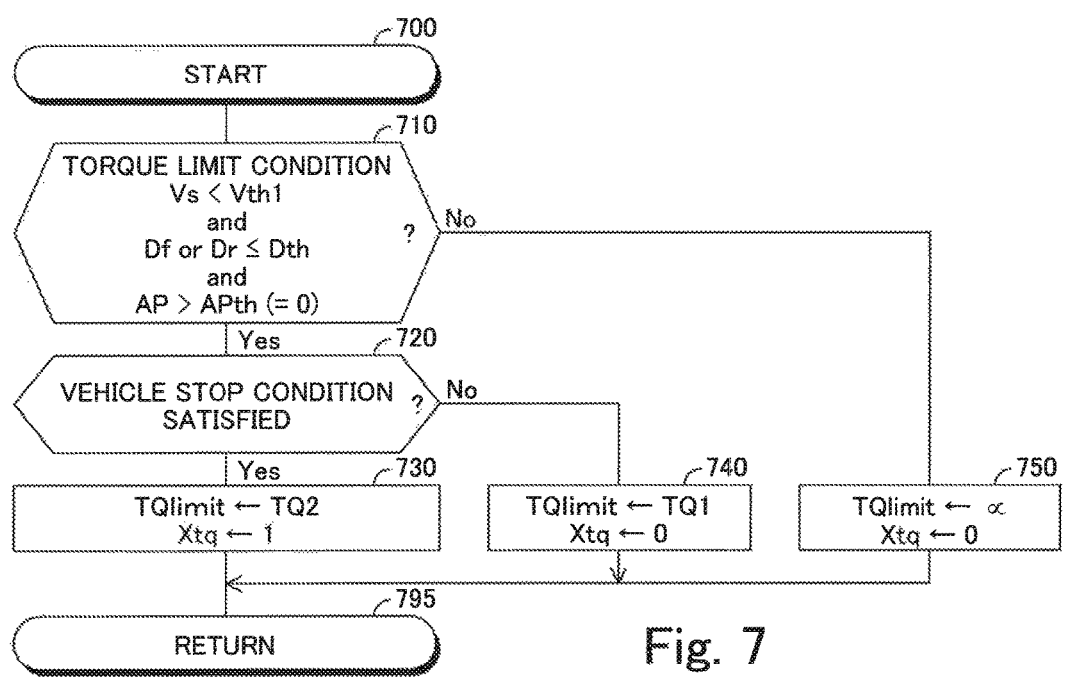
FIG. 7 is a view for showing a flowchart of a routine executed by the CPU.

Further, the CPU is configured or programmed to execute a routine shown by a flowchart shown in FIG. 7 each time a predetermined time elapses.

Therefore, at a predetermined timing, the CPU starts a process from a step 700 and then, proceeds with the process to a step 710 to determine whether or not the torque limit condition that the vehicle speed Vs is smaller than the first threshold vehicle speed Vth1, the forward object distance Df is equal to or smaller than the threshold distance Dth and the acceleration pedal operation amount AP is larger than the threshold operation amount APth (i.e., zero) is satisfied if the shift lever 40 is set at the forward traveling range is satisfied. On the other hand, if the shift lever 40 is set at the rearward traveling range, the CPU determines whether or not the torque limit condition that the vehicle speed Vs is smaller than the first threshold vehicle speed Vth1, the rearward object distance Dr is equal to or smaller than the threshold distance Dth and the acceleration pedal operation amount AP is larger than the threshold operation amount APth (i.e., zero).

When the torque limit condition is satisfied, the CPU determines "Yes" at the step 710 and then, proceeds with the process to a step 720 to determine whether or not the first or second stop condition is satisfied.

When the first or second stop condition is satisfied, the CPU determines "Yes" at the step 720 and then, proceeds with the process to the step 730 to set the limit driving torque TQlimit to the second driving torque TQ2 equal to or larger than the predetermined driving torque TQp and set the value of the limit torque increase flag Xtq to "1". Then, the CPU proceeds with the process to a step 795 to terminate an execution of this routine once.

In this case, the second engine output torque limitation is performed. Therefore, when the acceleration pedal operation amount AP is sufficiently large, the engine output torque TQE equal to or larger than the predetermined engine output torque TQEp is output from the engine 10 and thus, the vehicle speed Vs increases quickly and then, reaches the second threshold vehicle speed Vth2. In addition, the value of the limit torque increase flag Xtq is "1" and thus, the CPU determines "No" at the step 620 of FIG. 6 and proceeds with the process to the step 640. Therefore, after the vehicle speed Vs reaches the second threshold vehicle speed Vth2, the CPU determines "Yes" at the step 640 when the forward or rearward object arrival time TTCf or TTCr becomes equal to or smaller than the threshold time TTCth and then, proceeds with the process to the step 650. As a result, the forced braking is performed.

On the other hand, when the stop condition is not satisfied upon the execution of the process of the step 720, the CPU determines "No" at the step 720 and then, proceeds with the process to the step 740 to set the limit driving torque TQlimit to the first driving torque TQ1 smaller than the predetermined driving torque TQp and set the value of the limit torque increase flag Xtq to "0". Then, the CPU proceeds with the process to the step 795 to terminate the execution of this routine once. In this case, the first engine output torque limitation is performed.

When the torque limit condition is not satisfied upon the execution of the process of the step 710, the CPU determines "No" at the step 710 and then, proceeds with the process to the step 750 to set the limit driving torque TQlimit to the infinite, that is, release the setting of the limit driving torque TQlimit and set the value of the limit torque increase flag Xtq to "0". Then, the CPU proceeds with the process to the step 795 to terminate the execution of this routine once. In this case, neither the first nor second engine output torque limitation are performed and the normal control of the engine 10 is performed.

Figure 8:
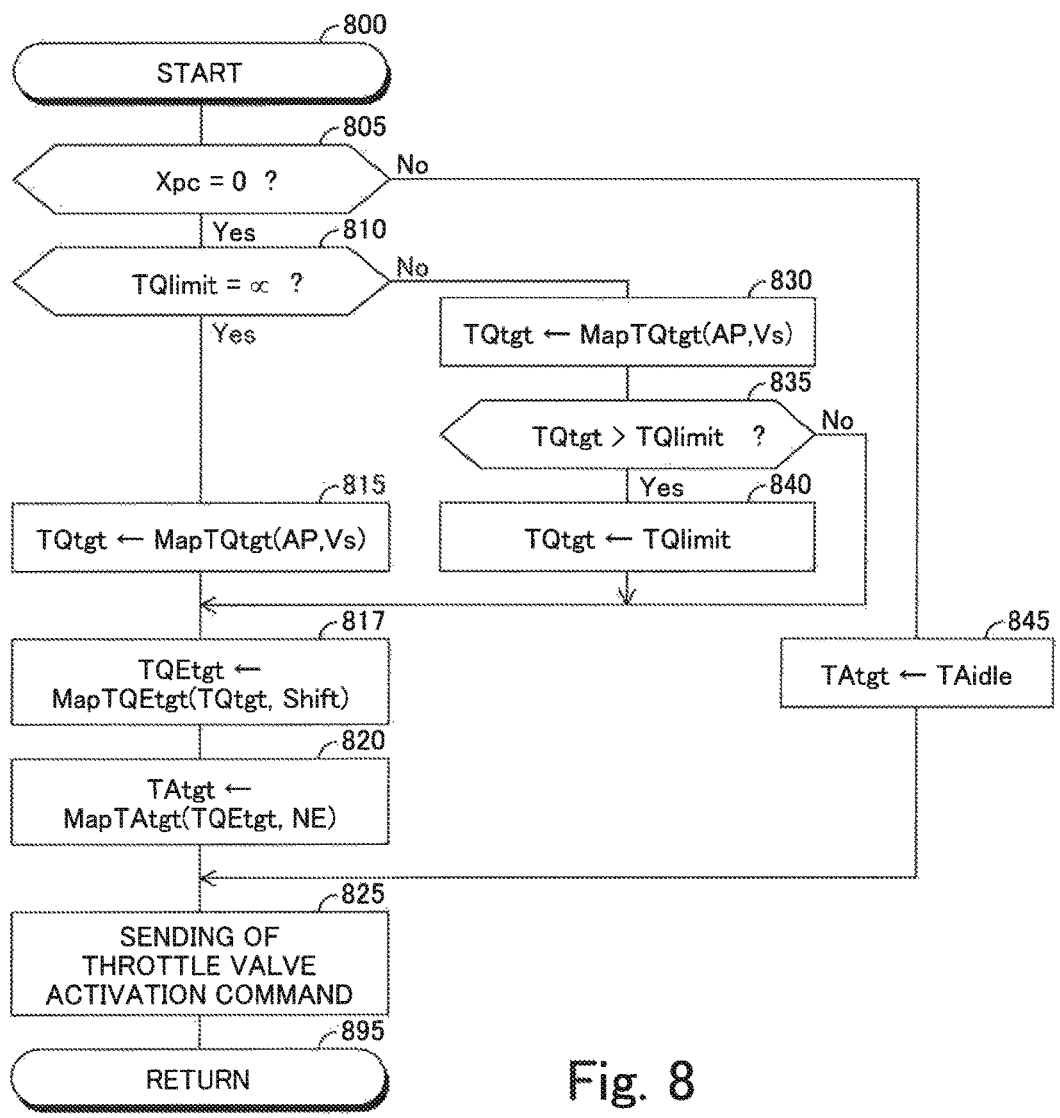
FIG. 8 is a view for showing a flowchart of a routine executed by the CPU.

Further, the CPU is configured or programmed to execute a routine shown by a flowchart in FIG. 8 each time a predetermined time elapses. Therefore, at a predetermined timing, the CPU starts a process from a step 800 and then, proceeds with the process to the step 805 to determine whether or not the value of the forced braking flag Xpc is "0", that is, the forced braking is performed.

When the value of the forced braking flag Xpc is "0", the CPU determines "Yes" at the step 805 and then, proceeds with the process to a step 810 to determine whether or not the limit driving torque TQlimit is set to the infinite, that is, the setting of the limit driving torque TQlimit is released.

When the limit driving torque TQlimit is set to the infinite, the CPU determines "Yes" at the step 810 and then, sequentially executes processes of steps 815 to 825 described below. Thereafter, the CPU proceeds with the process to a step 895 to terminate an execution of this routine once.

Step 815: The CPU applies the acceleration pedal operation amount AP and the vehicle speed Vs to a look-up table MapTQtgt(AP, Vs) to acquire the requested driving torque TQtgt.

Step 817: The CPU applies the requested driving torque TQtgt and the gear position Shift to a look-up table MapTQEtgt(TQtgt,Shift) to acquire the target engine output torque TQEtgt.

Step 820: The CPU applies the engine speed NE and the target engine output torque TQEtgt acquired at the step 817 to a look-up table MapTAtgt(TQEtgt,NE) to acquire the target throttle valve opening degree TAtgt.

Step 825: The CPU sends a command for activating the throttle valve 11 such that the target throttle valve opening degree TAtgt acquired at the step 820 is achieved.

On the other hand, when the limit driving torque TQlimit is not set to the infinite upon the execution of the process of the step 810, the CPU determines "No" at the step 810 and then, proceeds with the process to a step 830 to apply the acceleration pedal operation amount AP and the vehicle speed Vs to the look-up table MapTQtgt(AP, Vs) to acquire the requested driving torque TQtgt.

Then, the CPU proceeds with the process to a step 835 to determine whether or not the requested driving torque TQtgt acquired at the step 830 is larger than the limit driving torque TQlimit. When the requested driving torque TQtgt is larger than the limit driving torque TQlimit, the CPU determines "Yes" at the step 835 and then, proceeds with the process to a step 840 to set the limit driving torque TQlimit as the requested driving torque TQtgt. In other words, the CPU limits the requested driving torque TQtgt to the limit driving torque TQlimit.

Then, the CPU proceeds with the process to the step 817 to acquire the target engine output torque TQEtgt by using the requested driving torque TQtgt set at the step 840 and then, proceeds with the process to the step 820 to acquire the target throttle valve opening degree TAtgt by using the target engine output torque TQEtgt acquired at the step 817. Then, the CPU proceeds with the process to the step 825 to send the command for activating the throttle valve 11 such that the target throttle valve opening degree TAtgt acquired at the step 820 is achieved. In this case, the engine output torque TQE output from the engine 10 is limited to the torque depending on the limit driving torque TQlimit.

When the requested driving torque TQtgt acquired at the step 830 is equal to or smaller than the limit driving torque TQlimit upon the execution of the process of the step 835, the CPU determines "No" at the step 835 and then, sequentially executes the processes of the steps 817 and 820. As a result, the target throttle valve opening degree TAtgt depending on the requested driving torque TQtgt is acquired. Then, the CPU proceeds with the process to the step 825 to send the command for activating the throttle valve 11 such that the target throttle valve opening degree TAtgt acquired at the step 820 is achieved.

Further, when the value of the forced braking flag Xpc is "1" upon the execution of the process of the step 805, that is, the forced braking is performed, the CPU determines "No" at the step 805 and then, proceeds with the process to the step 845 to set the target throttle valve opening degree TAtgt to the predetermined idling opening degree TAidle. Then, the CPU proceeds with the process to the step 825 to send the command for activating the throttle valve 11 such that the target throttle valve opening degree TAtgt set at the step 845 is achieved. It should be noted that the predetermined idling opening degree TAidle is an opening degree when the throttle valve 11 is closed generally completely, that is, generally zero or a minute opening degree.

The concrete operation of the embodiment control apparatus has been described. According to the embodiment control apparatus, the forced braking or the engine output torque limitation is performed.

It should be noted that the present disclosure is not limited to the aforementioned embodiment and various modifications can be employed within the scope of the present subject matter.

For example, the present disclosure can be applied to an electric vehicle which travels by a torque output from an electric motor as a torque output device and a hybrid vehicle which travels by a torque output from the engine as the torque output device and/or a torque output from the electric motor as the torque output device.

Further, the present disclosure can be applied to a vehicle which executes a torque limit control for limiting the requested driving torque TQtgt to a torque equal to or smaller than a predetermined torque (for example, the first torque TQ1) when the setting of the shift lever 40 is changed from a range other than the forward traveling range (e.g., the parking range, the rearward traveling range, the neutral range and the like) to the forward traveling range with the driver of the vehicle 100 operating the acceleration pedal 20 to the relatively large extent.

In other words, the present disclosure can be applied to a vehicle which executes a torque limit control for limiting the requested driving torque TQtgt to a torque equal to or smaller than the predetermined torque when a torque limit condition that the acceleration pedal operation amount AP is larger than the threshold operation amount APth and the setting of the shift lever 40 is changed from the range other than the forward traveling range to the forward traveling range is satisfied.

According to this torque limit control, the vehicle speed Vs is maintained at an extreme small vehicle speed. Therefore, the present disclosure can be applied to a vehicle which executes the torque limit control for limiting the output torque to a torque equal to or smaller than the predetermined torque when the torque limit condition that the vehicle speed Vs is smaller than the threshold vehicle speed and it is estimated that the driver of the vehicle mistakenly operates the acceleration pedal to the extent of an acceleration pedal operation amount larger than the threshold operation amount.

Further, the front millimeter-wave radar 65 may be a laser radar provided around a room mirror inside of a front windshield of the vehicle.

Further, in the embodiment, the threshold operation amount APth used at the step 710 is set to zero. In this regard, the threshold operation amount APth may be a predetermined value larger than zero.

Further, in the embodiment, the engine output torque TQE is controlled by controlling the throttle valve opening degree TA. In this regard, if an amount of the air which the fuel can burn sufficiently is suctioned into each of the combustion chambers, the engine output torque TQE may be controlled by controlling the fuel injection amount Q.

Further, the present disclosure can be applied to a multi-cylinder four-cycle compression-ignition diesel internal combustion engine. In general, when the engine 10 is the diesel engine, the engine output torque TQE is controlled by controlling the fuel injection amount Q.

Further, the embodiment control apparatus is configured to calculate the forward object distance Df, the rearward object distance Dr, the forward relative speed dVf, the rearward relative speed dVr, the forward relative orientation ROf, the rearward relative orientation ROr, the forward object arrival time TTCf and the rearward object arrival time TTCr independently of the range, at which the shift lever 40 is set.

In this regard, the embodiment control apparatus may be configured to calculate the forward object distance Df, the forward relative speed dVf, the forward relative orientation ROf and the forward object arrival time TTCf when the shift lever 40 is set at the forward traveling range and calculate the rearward object distance Dr, the rearward relative speed dVr, the rearward relative orientation ROr and the rearward object arrival time TTCr when the shift lever 40 is set at the rearward traveling range.

Figure 6:
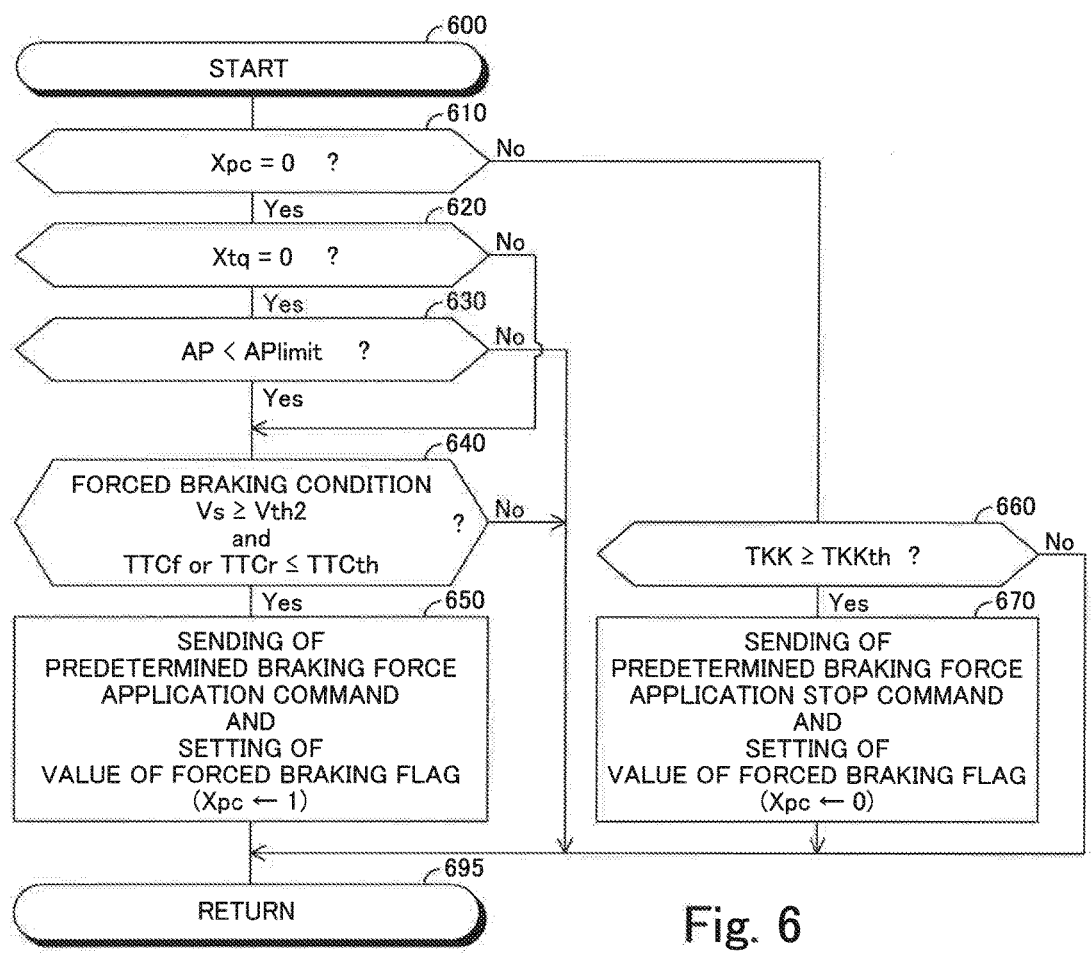
FIG. 6 is a view for showing a flowchart of a routine executed by the CPU.

Further, the steps 620 and 630 of FIG. 6 may be omitted. In this case, the setting of the limit torque increase flag Xtq at the steps 730, 740 and 750 of FIG. 7 are omitted.

Further, the threshold time TTCth compared with the forward object arrival time TTCf and the threshold time TTCth compared with the rearward object arrival time TTCr may be different from each other. In addition, the threshold distance Dth compared with the forward object distance Df and the threshold distance Dth compared with the rearward object distance Dr may be different from each other.

What is claimed is:

1. A vehicle control apparatus applied to a vehicle comprising:
   a torque output device for generating an output torque for accelerating the vehicle;
   an acceleration operator operated by a driver of the vehicle; and
   a braking device for braking the vehicle,
   the vehicle control apparatus comprising:
   a vehicle speed detection means configured to detect a traveling speed of the vehicle as a vehicle speed;
   an object distance/relative speed detection means configured to detect a distance between an object existing in a traveling direction of the vehicle and the vehicle as an object distance and detect a difference in moving speed between the object and the vehicle as a relative speed; and
   control means configured to control the torque output device such that the output torque increases as an operation amount of the acceleration operator increases and control the braking device such that the vehicle is braked when the vehicle is needed to be braked,
   the control means being configured:
   to calculate a time required for the vehicle to reach the object as an object arrival time on the basis of the object distance and the relative speed;
   to execute a torque limit control for limiting the output torque to a torque equal to or smaller than a predetermined first torque when a torque limit condition that the vehicle speed is smaller than a first threshold vehicle speed, the operation amount of the acceleration operator is larger than a threshold operation amount, and the object distance is equal to or smaller than a threshold distance is satisfied; and
   to execute a forced braking control for forcibly braking the vehicle by the braking device when a forced braking condition that the vehicle speed is equal to or larger than a second threshold vehicle speed equal to or larger than the first threshold vehicle speed and the object arrival time is equal to or smaller than a threshold time is satisfied,
   wherein the control means is configured:
   to determine whether or not it is estimated that a stop condition that if the output torque is a predetermined torque larger than the predetermined first torque, the vehicle speed reaches the second threshold vehicle speed to satisfy the forced braking condition before the object arrival time becomes equal to or smaller than the threshold time is satisfied; and
   to execute the torque limit control such that the output torque is limited to a torque equal to or smaller than a predetermined second torque equal to or larger than the predetermined torque when the torque limit condition is satisfied and the stop condition is satisfied.

2. The vehicle control apparatus according to claim 1, wherein the first threshold vehicle speed is set to a vehicle speed capable of stopping the vehicle before the vehicle reaches the object if the control means starts to cause the braking device to brake the vehicle with a predetermined braking force when the object distance corresponds to the threshold distance.

3. The vehicle control apparatus according to claim 1, wherein the threshold time is set to a time capable of stopping the vehicle before the vehicle reaches the object if the control means starts to cause the braking device to brake the vehicle with a predetermined braking force when the object arrival time corresponds to the threshold time.

4. A vehicle control apparatus applied to a vehicle comprising:
   a torque output device for generating an output torque for accelerating the vehicle;
   an acceleration operator operated by a driver of the vehicle; and
   a braking device for braking the vehicle,
   the vehicle control apparatus comprising:
   a vehicle speed sensor configured to detect a traveling speed of the vehicle as a vehicle speed;
   an object distance/relative speed detector configured to detect a distance between an object existing in a traveling direction of the vehicle and the vehicle as an object distance and detect a difference in moving speed between the object and the vehicle as a relative speed; and
   an electronic control unit configured to control the torque output device such that the output torque increases as an operation amount of the acceleration operator increases and control the braking device such that the vehicle is braked when the vehicle is needed to be braked, the electronic control unit being configured:

to calculate a time required for the vehicle to reach the object as an object arrival time on the basis of the object distance and the relative speed;

to execute a torque limit control for limiting the output torque to a torque equal to or smaller than a predetermined first torque when a torque limit condition that the vehicle speed is smaller than a first threshold vehicle speed, the operation amount of the acceleration operator is larger than a threshold operation amount, and the object distance is equal to or smaller than a threshold distance is satisfied; and to execute a forced braking control for forcibly braking the vehicle by the braking device when a forced braking condition that the vehicle speed is equal to or larger than a second threshold vehicle speed equal to or larger than the first threshold vehicle speed and the object arrival time is equal to or smaller than a threshold time is satisfied, wherein the electronic control unit is configured:

to determine whether or not it is estimated that a stop condition that if the output torque is a predetermined torque larger than the predetermined first torque, the vehicle speed reaches the second threshold vehicle speed to satisfy the forced braking condition before the object arrival time becomes equal to or smaller than the threshold time is satisfied; and to execute the torque limit control such that the output torque is limited to a torque equal to or smaller than a predetermined second torque equal to or larger than the predetermined torque when the torque limit condition is satisfied and the stop condition is satisfied.

5. The vehicle control apparatus according to claim 4, wherein the first threshold vehicle speed is set to a vehicle speed capable of stopping the vehicle before the vehicle reaches the object if the electronic control unit starts to cause the braking device to brake the vehicle with a predetermined braking force when the object distance corresponds to the threshold distance.

6. The vehicle control apparatus according to claim 4, wherein the threshold time is set to a time capable of stopping the vehicle before the vehicle reaches the object if the electronic control unit starts to cause the braking device to brake the vehicle with a predetermined braking force when the object arrival time corresponds to the threshold time.

* * * * *

UNITED STATES PATENT AND TRADEMARK OFFICE
CERTIFICATE OF CORRECTION

PATENT NO. : 10,173,672 B2
APPLICATION NO. : 15/361812
DATED : January 8, 2019
INVENTOR(S) : Yoji Mizoguchi It is certified that error appears in the above-identified patent and that said Letters Patent is hereby corrected as shown below:

In the Specification

In Column 7, Line 62, before "traveling", delete "101ry" and insert --101rv--.

Signed and Sealed this
Fifth Day of March, 2019

Andrei Iancu
*Director of the United States Patent and Trademark Office*